Aug. 3, 1954 W. H. TANKE 2,685,384
PLANTER ATTACHMENT FOR TRACTORS
Filed Dec. 18, 1948 2 Sheets-Sheet 1

Inventor
Willard H. Tanke
Louis V. Schiavo
by
Attorney

Aug. 3, 1954

W. H. TANKE 2,685,384

PLANTER ATTACHMENT FOR TRACTORS

Filed Dec. 18, 1948

Inventor
Willard H. Tanke
Louis V. Schiavo
by
Attorney

Patented Aug. 3, 1954

2,685,384

UNITED STATES PATENT OFFICE 2,685,384

PLANTER ATTACHMENT FOR TRACTORS

Willard H. Tanke, La Crosse, Wis., assignor to Allis-Chalmers Manufacturing Company, Milwaukee, Wis., a corporation of Delaware Application December 18, 1948, Serial No. 65,994

7 Claims. (Cl. 222—178)

This invention relates generally to planters of the type mounted on a traveling support, such as a tractor or a wheeled frame propelled by a tractor or other suitable draft means, and is more particularly concerned with improving the structure and/or mechanism for mounting and operating a plurality of seeders disposed in laterally spaced relation with respect to the direction of travel.

In planting vegetable crops, two types of tractor attached seeders are commonly used, that is, a ground driven type wherein the seeder shaft is driven from a ground engaging wheel (there is usually one such wheel on each ground rig thus affording an independent drive for each seeding device), and a power driven type wherein the seeder shaft is driven through a sprocket mounted on the rear drive wheel of the tractor. In power driven seeders, it has heretofore been customary to mount a plurality of hopper type seed feeding devices on a frame structure detachably secured to the tractor frame and to drive each seeder shaft from a counter shaft which is carried by the detachable frame structure and which is in turn driven from a sprocket or the like mounted on the rear drive wheel of the tractor. In general, these commonly used power driven seeders are incapable of being readily rearranged to vary the number and/or lateral spacing of the seed feeding devices and while there is now on the market a power driven seeder having a direct drive from the rear tractor drive wheel to one of a plurality of end connected seeder shafts, it is believed that none of these known arrangements afford the advantage of ready rearrangement as to the number and spacing of the seed feeding devices.

In this connection, best results are obtained in growing vegetables, such as lettuce, carrots, onions, spinach, etc., if the row spacing conforms with the nature of the crop being planted. For example, some such crops require a row spacing of only 12 inches while others require a row spacing of 18 or more inches, and it should be apparent that the number of rows a planter is capable of simultaneously seeding necessarily varies according to the row spacing. For instance, a planter capable of simultaneously seeding a maximum of six 12 inch rows would obviously seed a lesser number of rows if the row spacing were changed from 12 to 18 inches. And in truck farming, it is not uncommon during a day's planting to change the row spacing of a seeder as many as five times. Consequently, the matter of ready changeability is of primary importance as is also the matter of locating the seeding devices so as to advantageously position the seed conveying tubes at their most effective angle.

It is, therefore, an object of this invention to provide a mounting structure and drive mechanism for operatively supporting a plurality of hopper type seed feeding devices in laterally spaced relation on a traveling support in a manner such that the number and/or spacing of such devices may be readily changed without altering the position of a drive element connectable therewith.

Another object of the present invention is to provide an improved tractor mounted seeder combination wherein a hopper type seed feeding device may be positioned on the central longitudinal axis of the tractor between the front and rear wheel axle structures thereof and wherein similar seed feeding devices may be symmetrically arranged laterally of said central axis with their seeder shafts end connected in axial alignment.

Another object of this invention is to provide a mounting structure and drive mechanism for operatively supporting a plurality of hopper type seeding devices in laterally spaced relation on a traveling support, the mounting structure and drive mechanism incorporating parts constructed and combined for coaction in a manner affording a maximum number of row combinations with a minimum of apparatus and with the least amount of time and effort.

Still another object of the present invention is to provide an improved seeder attachment for a traveling support, the attachment incorporating features, including combinations and/or subcombinations of parts, affording a simplified and durable construction which can be readily assembled and mounted, in whole or in part, on a traveling support, and thereafter quickly changed to obtain various row combinations, as desired.

Accordingly, this invention may be considered as comprising features of construction and/or combination directed toward accomplishing and affording one or more of the aforementioned and other objects and advantages as hereinafter more particularly pointed out in the following description of an illustrative apparatus and in the appended claims, reference being had to the accompanying drawings, in which:

Fig. 4 is a partial bottom view of the hopper base plate and valve assembly;

Fig. 5 is a schematic front elevation showing a three hopper arrangement, the left outer and intermediate hopper attaching stations being unsymmetrically disposed relative to a vertical longitudinal plane through the chain drive; and Fig. 6 is the same as Fig. 5, except that it shows the corresponding two hopper arrangement.

Figure 1:
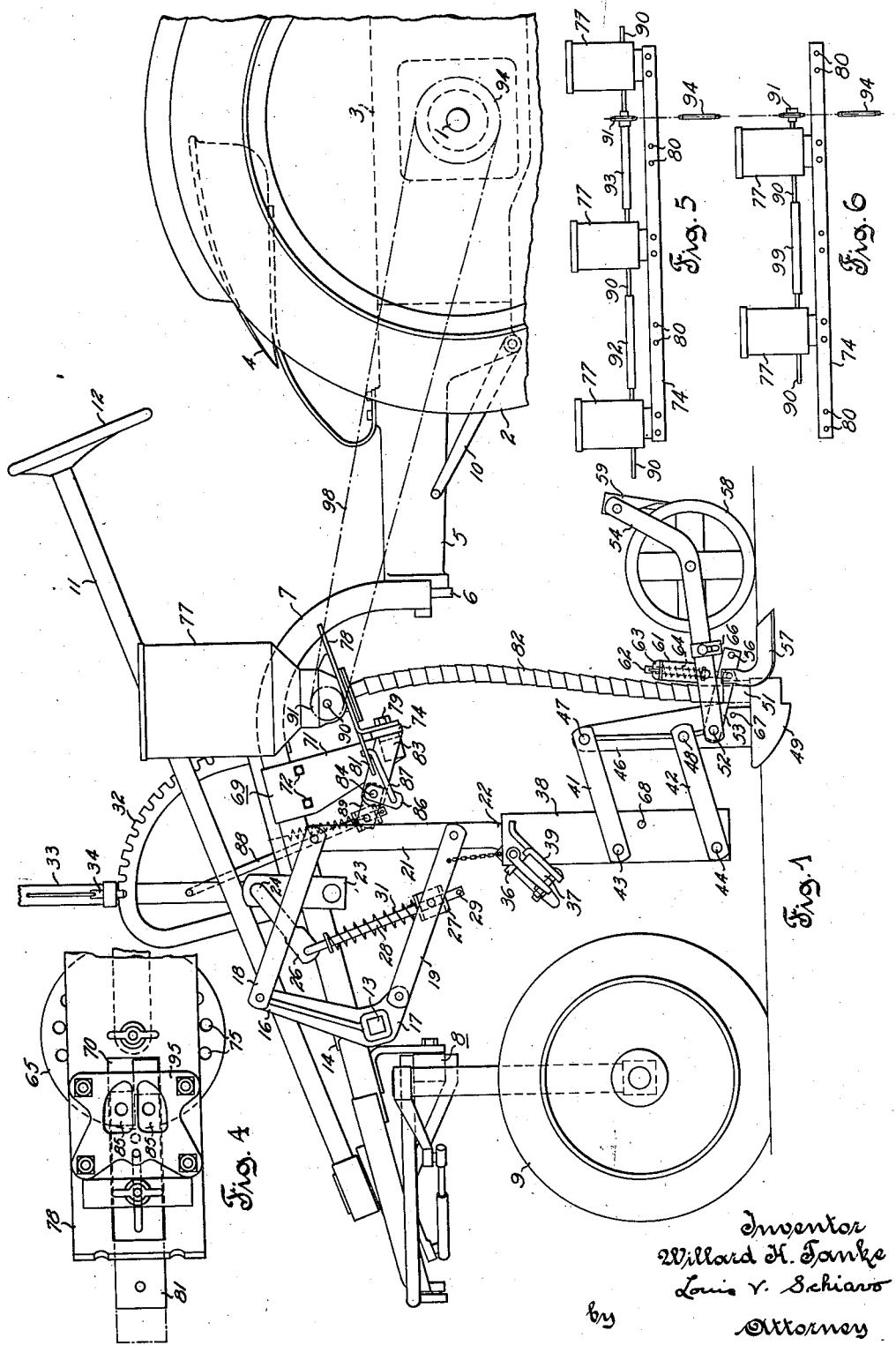
Fig. 1 is a side view of a tractor mounted seeder embodying the invention with parts broken away and omitted to better show the general arrangement.
Figure 2:
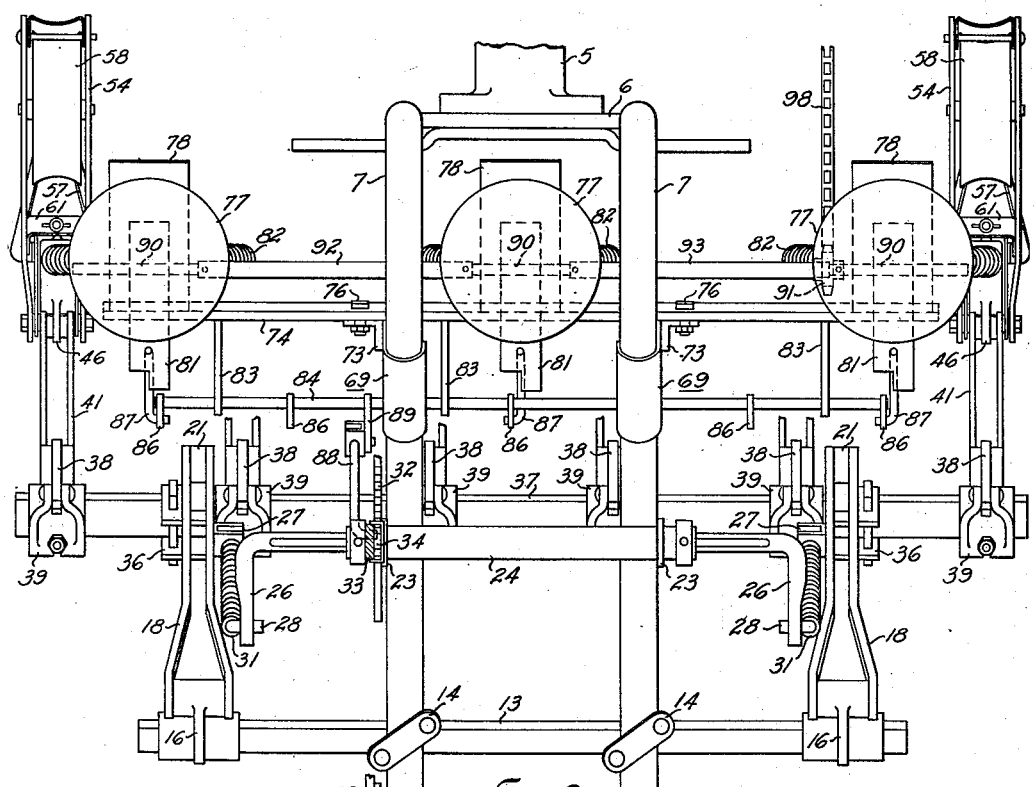
Fig. 2 is a partial plan view of the combination shown in Fig. 1.

Referring particularly to Figs. 1 and 2, it will be seen that the traveling support or tractor element of the combination includes a rear axle structure 1 mounting a pair of laterally spaced ground engaging traction wheels 2 at opposite ends thereof and mounting a centrally disposed power unit including a transmission housing 3 enclosing gearing (not shown) drivingly connected in a conventional manner with the axle elements mounting the traction wheels 2, and including an engine (not shown) operatively attached to the rear of housing 3. An operator's seat or station 4 is mounted on a tubular central frame part or stub member 5 extending forwardly from said axle structure and is disposed thereby between the rear traction wheels 2 in elevated relation to the forward portion of housing 3. A part 6 is fixedly secured to the forward end of the central frame part 5, being positioned thereby transversely of the tractor. A pair of laterally spaced upwardly arched tubular frame members 7 are provided with gear end portions rigidly united with part 6 and forward end portions supported on a front axle structure 8, which mounts a pair of laterally spaced ground engaging dirigible wheels 9 at opposite ends thereof. The steering mechanism includes a rearwardly extending shaft 11, which mounts a steering wheel 12 disposed within easy reach of an operator sitting at his station 4, and it is to be understood that the tractor is also provided with the usual operator actuated controls of which only a single foot pedal 10 is shown.

A rigid transverse cross bar 13 is secured to the underside of opposed forward portions of tubular frame members 7, immediately to the rear of front axle structure 8, by means of suitable clamps 14. Bar 13 is generally parallel to the transverse front axle structure 8 and preferably projects equal distances to either side of frame members 7. A similar hanger member is secured on each end portion of bar 13 for adjustment longitudinally thereof, and presents an upwardly extending arm 16 and a depending arm 17. The upper arm 16 of each hanger pivotally mounts a rearwardly extending link 18, and the lower arm 17 of each hanger pivotally mounts a rearwardly extending link 19. The rear ends of upper and lower links 18 and 19 are pivotally connected with vertically spaced portions of a rigid link 21, which extends beneath lower link 19 and terminates in a forwardly projecting end portion 22 having a clamp means associated therewith for the reception of a rectangular tool frame bar. It is to be understood that the laterally spaced hangers, one on each side of the tractor, are in transverse alignment relative to the longitudinal axis of the tractor, and that the clamp means depending therefrom are similarly aligned.

A pair of upstanding brackets 23 are secured to opposed portions of frame members 7 in any suitable manner, and a rock shaft 24 is rotatably mounted in the brackets and disposed thereby on the top side of frame members 7 in generally parallel relation to the front axle structure 8 and bar 13. The opposite end portions of the shaft 24 are bent at a right angle to its longitudinal axis so as to form crank or lift arms 26. Each arm is positioned in forward and downward extending relation with respect to the longitudinal axis of the shaft and generally alongside the inner or tractor side of the adjacent one of the upper links 18. Preferably shaft 24 is a conventional fabricated structure comprising a tubular main element telescopically receiving separate crank elements (note Fig. 2) for selectively positioning arms 26 to conform with any selected lateral adjustment of the similar hanger members mounted on bar 13. The free end of each lift arm 26 has an operative lost motion connection with an intermediate portion of the adjacent one of the links 19, this connection being a well known type comprising a pivot block 27, a lift rod 28 slidably extending through block 27, a pin 29 preventing withdrawal of rod 28 from block 27, and a compression spring 31 surrounding the intermediate portion of rod 28. A notched quadrant 32 and a lever 33 mounting a quadrant engaging latch 34 are operatively associated with rock shaft 24 for actuating and maintaining the shaft in any selected position to thereby adjust the vertical position of clamp means 36 relative to the frame 7. Preferably the upper portion of lever 33 (not shown) extends rearward to a point within easy reach of an operator seated at station 4, and it should now be obvious that laterally aligned parts 36 constitute a pair of underslung vertically adjustable supports.

An elongated structure comprising a rigid draft bar 37, rectangular in transverse cross section, is mounted on parts 36 for movement therewith and positioned thereby to extend transversely of the tractor in underslung relation thereto and in symmetrical relation relative to the longitudinal axis of the tractor. A group of six similar ground rigs (of which only the two outer rigs are completely shown) are detachably mounted on spaced portions of draft bar 37 for selective adjustment therealong. Each rig includes a fabricated plate 38 detachably secured to the draft bar 37 by a clamp means 39, the plate 38 being disposed thereby in immediate rearward depending relation to bar 37. A pair of fabricated links 41 and 42 are provided with front end portions connected with plate 38 by vertically spaced pivots 43 and 44, respectively, and with rear end portions connected to a part 46 by vertically spaced pivots 47 and 48, respectively. The links are of substantially equal length, and the vertical spacing of their points of pivotal connection with plate 38 and part 46 are preferably such as to form a parallel linkage. A ground opener 49 is rigidly detachably mounted on part 46 in any suitable manner and is disposed thereby in lower adjacent relation to the lower extremity thereof and in lower spaced relation to link 42. The part 46 is provided with a heel portion 51 having a vertical opening formed therein for receiving the lower extremity of a seed tube. Part 46 is further provided with a pivot bolt 52 mounted to extend transversely therethrough intermediate link 42 and opener 49.

Two similar short links 53 are terminally mounted on bolt 52, one on either side of part 46, and two similar long links 54 are also terminally mounted on bolt 52 alongside links 53. All of these links pivot freely about the common transverse axis afforded by bolt 52. The free ends of short links 53 are connected together by a spacer bolt 56 to form therewith a U-shaped frame, and coverer blades 57 are secured to opposed portions of links 53, for vertical swinging movement therewith, in proper working relation to opener 49. A press or gauge wheel 58 is journalled in opposed intermediate portions of long links 54 and is positioned thereby in longitudinal alignment with opener 49 and coverer blades 57 and in rearward spaced relation thereto. The rearward extremities of long links 54 extend to the rear and up from the axis of the press or gauge wheel 58 to operatively mount a scraper 59 generally as indicated. A U-shaped member 61 is terminally pivotally secured to opposed portions of long links 54 intermediate the press or gauge wheel 58 and pivot bolt 52 and extends up and to the rear for swinging movement about a transverse axis. A bolt 62 is terminally pivotally secured, in any suitable manner, to the extreme rearward part of heel portion 51 and extends up and to the rear generally in alignment with member 61 and through an opening in the closed end thereof to mount an adjusting nut 63 threaded on its free end. A compression spring 64 is arranged on the bolt 62 to react against a pressure seat associated with the bolt and against the member 61. It will be seen that the depth to which the ground opener penetrates is adjusted by manipulating adjusting nut 63 to vary the vertical distance between opener 49 and press or gauge wheel 58. Appropriate stops 66 and 67 are provided to limit, respectively, the upward and the downward swing of the coverer blades. It should be readily apparent that links 41 and 42 afford a vertical movement of part 46 relative to plate 38 and that, conversely, these links also afford a vertical movement of draft bar 37 and plate 38 relative to part 46. Also, it should be apparent that the extent to which parts 36 and draft bar 37 can be moved vertically upward relative to part 46 is necessarily limited since in order to effectively raise the ground rig or rigs by actuation of lever 33, the support therefor must be capable of picking up and lifting the rig or rigs clear of the ground a sufficient distance practical for all purposes of normal use, including transport purposes. In the construction herein shown, this is accomplished by providing plate 38 with a projection 68 positioned to engage the underside of link 41 as draft bar 37 and plate 38 are moved vertically upward a predetermined distance relative to part 46.

A pair of brackets 69 are supported by opposed intermediate portions of frame members 7 in depending relation thereto and are disposed thereby in rearward spaced relation to brackets 23. Each bracket 69 comprises a plate 71 hooked over the associated tubular frame member 7 and detachably secured thereto by a pair of bolts 72, which pass beneath the frame member and through opposed portions of the hook. A pair of right angle clips 73 (note Fig. 2), each having one leg thereof fixedly secured in side abutting relation to a lower portion of one of plates 71, are disposed thereby in lower spaced relation to frame members 7 with their free legs positioned to the rear of plates 71 and in transverse alignment. An elongated hopper support bar 74, generally rectangular in transverse cross section and having a side surface abutting the free legs of clips 73, is detachably secured to brackets 69 by means of bolts 76, which pass through longitudinally spaced openings in the bar and through similarly spaced openings in the free legs of clips 73, these brackets and clips positioning bar 74 to extend transversely of the tractor in underslung relation to the frame members 7.

Figure 3:
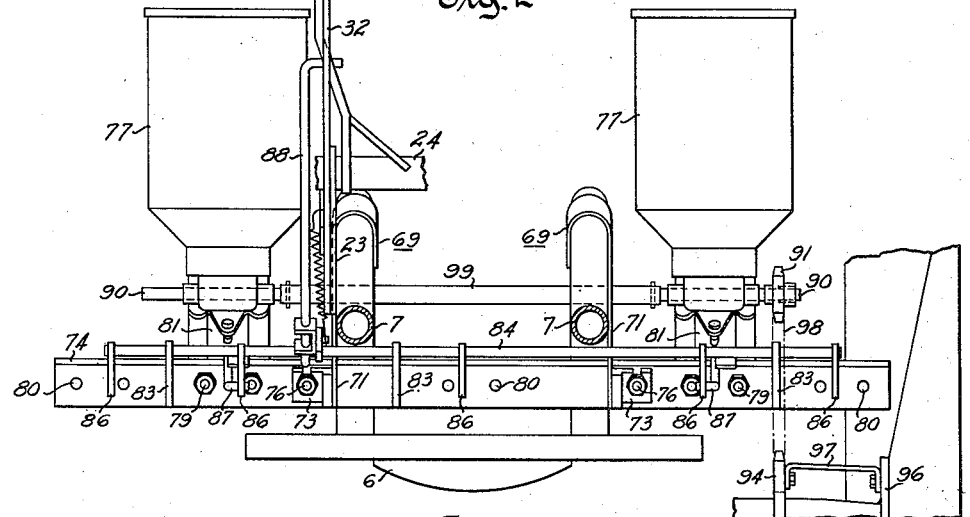
Fig. 3 is a front view of the seeder mounting support showing a two hopper arrangement.

Referring again to Fig. 2, it will be noted that a group of three seed dispensing hopper structures 77 are mounted on bar 74 in transverse alignment and in symmetrical relation with respect to the longitudinal axis of the tractor. Each hopper is positioned laterally between a pair of ground rigs, one being mounted on the central portion of bar 74, hereinafter referred to as the center hopper attaching station. The others are mounted on the left and the right outer end portions of the bar 74 as seen when looking forward from the operator's station, these portions of bar 74 being hereinafter referred to as the left and the right outer hopper attaching stations, respectively. Referring to Fig. 3, it will be seen that bar 74 is provided with five sets or pairs of holes 80, thus presenting 5 hopper attaching stations. And in this connection, the stations intermediate the center and left and right outer hopper attaching stations will hereinafter be referred to as the left and right intermediate stations, respectively. Each hopper is provided with a support or base plate 78 having a downwardly bent forward leg which is detachably secured by a pair of bolts 79 to a hopper attaching station comprising a portion of bar 74 provided with a pair of suitably spaced bolt receiving holes 80. Each seed hopper is preferably detachably secured to plate 78, as by bolts (not shown) and is supported thereby in an upright position with its base portion positioned above bar 74 and with its top extending above frame members 7, the central hopper being disposed between these frame members. An elongated valve plate 81 is slidably supported by plate 78 for movement longitudinally of the tractor.

Referring to Fig. 4, it will be seen that each hopper is of the dual feed type having a circular feed plate 65 in part overlying an aperture 70 in base plate 78, feed plate 65 having pairs of openings 75 therethrough selectively alignable with aperture 70 and with a pair of openings 85 presented by an underlying seed tube attaching part 95. Valve plate 81 slidably controls the discharge of seed through the pair of openings 75 aligned with the openings 85, this valve plate having a side portion of one end cut away and being positionable on plate 78 with either end thereof controlling the openings 75 to thereby simultaneously open or close both openings or to open or close only one such opening upon reciprocation of the valve plate. In addition, valve plate 81 may be inverted on base plate 78 to thereby open or close a selected one of the two openings 75. A pair of flexible seed tubes 82 are secured to the underside of each part 95 in laterally adjacent relation to one another and in seed receiving relation to the openings 85. The seed tubes diverge laterally and the lower extremities thereof are detachably connected in a conventional manner to the openings in the heels 51 of parts 46 of the associated ground rigs.

Three similar brackets 83 are terminally rigidly secured to longitudinally spaced portions of bar 74 and are disposed thereby to project forward therefrom in transverse alignment. A valve actuating shaft 84 is journalled in the forward free end portions of these brackets and is positioned thereby in forward spaced parallel relation to bar 74. A plurality of actuating arms 86 are terminally rigidly secured to longitudinally spaced portions of shaft 84 in depending laterally aligned relation thereto, there being one such arm disposed opposite each of the five hopper attaching stations. The free end of each arm 86 is detachably secured to the forward portion of the associated valve plate 81 by a link 87. Each end of the link is bent at a right angle to the longitudinal axis thereof. One engages a hole in the arm 86, and the other a hole in the adjacent end of plate 81. A cotter pin or the like (not shown) through each end serves to detachably secure the link in place. Shaft 84 is adapted to be actuated through means of a link and pivot block lost motion connection 88 between an intermediate portion of lever 33 and the adjacent end of an arm 89 fixedly secured to shaft 84, this connection serving to move valve plates 81 to a seed discharging position when the ground rigs are lowered and to a position terminating seed discharge when the rigs are elevated to transport position.

The feeding mechanism of each hopper includes a seeder shaft 90, which extends laterally beyond each side of the hopper. All of the shafts 90 are axially aligned transversely of the tractor. A power driven element or sprocket 91 is mounted on the inner end of the seeder shaft of the hopper mounted at the left outer hopper attaching station and is removably secured in place by means of a cotter pin. Tubular coupling elements 92 and 93, disposed between the hoppers, operatively connect all the seeder shafts 90 together for simultaneous rotation about a common axis. The outer end of coupling 93 is received by sprocket 91, a counterbore being provided in the hub thereof for this purpose. The other end of coupling 93 and both ends of coupling 92 each fit over the end of the adjacent one of seeder shafts 90. Each end of each coupling is detachably secured in place by means of a cotter pin. A power take off element, in this case a ring sprocket 94, surrounds the outer left end portion of axle structure 1 and is detachably secured to the left rear wheel attaching flange 96 through means of one or more U-shaped brackets 97 having an inner leg bolted to the outer side of sprocket 94 and having an outer leg bolted to the inner side of flange 96. Sprocket 94 is in longitudinal alignment with the sprocket 91 on the inner end of the seeder shaft of the hopper structure mounted at the left outer hopper attaching station, and an endless chain 98 drivingly connects sprocket 94 with seeder shaft sprocket 91.

Referring again to Fig. 3, it will be observed that hopper structures conforming with those previously described may be mounted on the two intermediate stations, thus affording a two hopper arrangement instead of the three hopper arrangement shown in Fig. 2. And since the manner of mounting these structures and operatively connecting their seed valve mechanisms with rock shaft 84 is identical to that described for the three hopper arrangement, a further explanation in this connection is deemed unnecessary for a complete understanding of the invention. However, it will be noted that a longer coupling element 99 is necessary in order to operatively connect the adjacent ends of seeder shafts 90 together for simultaneous rotation about a common axis as previously described, and that sprocket 91 is now mounted on the outer end of the seeder shaft of the hopper mounted at the left intermediate hopper attaching station with the counterbored end of its hub facing outwardly.

When thus positioned, sprocket 91 is longitudinally aligned with drive sprocket 94 for rotation in the same vertical longitudinal plane and is connected to be driven by the latter by the chain 98.

Figs. 2 and 3 show, respectively, a three hopper arrangement and the corresponding two hopper arrangement. The hopper attaching stations are unequally spaced along bar 74, and each hopper has a seeder shaft 90 which extends equal distances beyond the sides thereof. The driven sprocket 91, whether mounted on the laterally inner side of the hopper associated with the left outer hopper attaching station or on the laterally outer side of the same hopper when associated with the left intermediate hopper attaching station, is disposed laterally midway between the said stations and is longitudinally aligned with the drive sprocket 94, which is laterally fixed in position. Figs. 5 and 6 schematically show, respectively, a modified three hopper arrangement and the corresponding modified two hopper arrangement. The hopper attaching stations are equally spaced along bar 74, and in this modification each hopper has a seeder shaft 90 which extends unequal distances beyond the sides thereof. The driven sprocket 91, whether mounted on the laterally inner side of the hopper associated with the left outer hopper attaching station or on the laterally outer side of the same hopper when associated with the left intermediate hopper attaching station, is disposed laterally closer to the left intermediate hopper attaching station than to the left outer hopper attaching station but nevertheless is again longitudinally aligned with the drive sprocket 94, which is laterally fixed in position. It should be obvious now that the vertical longitudinal plane in which the chain drive operates may be, but is not necessarily, disposed laterally midway between the left outer and the left intermediate hopper attaching stations.

It should now be obvious that the five hopper attaching stations are so arranged that either three or two hopper structures may be readily mounted on bar 74 in symmetrical relation to the longitudinal axis of the tractor as shown in Figs. 2 and 3. In effecting a change from a three hopper to a two hopper arrangement or vice versa, all that has to be done, insofar as the hopper structures are concerned, is to remove drive chain 98, detach links 87 from actuating arms 86, detach the seed tubes 82 from the ground rigs, detach the hoppers from bar 74 by removing bolts 79, remove the coupling elements 92 and 93 or 99, and reposition the hoppers as desired, which involves changing drive sprocket 91 to either the inner or outer end of the hopper structure to be mounted at either the left outer or left intermediate hopper station, utilizing the appropriate coupling element or elements, reconnecting links 87 with the appropriate arms 86, and placing the drive chain over sprockets 91 and 94. Any such change in the arrangement of the hopper structures usually necessitates a change in the number and/or arrangement of the ground rigs which can be readily accomplished simply by detaching the clamps 39 securing the ground rigs to bar 37 and either removing and/or shifting the ground rigs as desired. When this has been done, all that remains is to reconnect the seed tubes 82 with the heel portions 51 of the rigs. In general, dual feed hopper structures are preferably employed as such structures permit the effective use of either six or three ground rigs with the three hopper arrangement shown in Fig. 2 or four or two rigs with the two hopper arrangement shown in Fig. 3. This is an important feature since it permits a wide variation in both the number and spacing of crop rows with a minimum number of parts.

In order to achieve this result, it should be apparent that seeder shaft sprocket 91 must be longitudinally alignable with the laterally fixed drive sprocket 94 irrespective of whether the associated hopper structure is mounted at the left outer hopper attaching station or at the left intermediate hopper attaching station. And this result is accomplished by employing a sprocket 91 mountable on either end of the hopper carried seeder shaft and by utilizing a length of seeder shaft and a hopper station spacing such that sprocket alignment is effected whenever a hopper structure is mounted on either of these two stations with the sprocket 91 disposed on the appropriate end of its seeder shaft 90. Moreover, this construction affords a further advantage in that the hopper structures are identical and may be interchanged as desired thus eliminating the necessity of utilizing a special hopper structure or other means for mounting the driven sprocket.

It should be obvious now that the number and/or spacing of the hoppers may be readily changed without the necessity of altering the position of the power take-off element. Also, it is to be observed that an odd number of hoppers having their seeder shafts end-connected in axial alignment are readily mounted between the front and rear axle structures transversely of the tractor and in symmetrical relation relative to the longitudinal axis thereof. In addition, it is to be observed that although normally either six or three rows are planted when the three hopper arrangement is used and either four or two rows are planted when the two hopper arrangement is used, other row combinations are possible. For example, three rows may be planted with two hoppers simply by having one hopper associated with two rigs and the other with one rig. In any case where a lesser number of rigs are to be used, the excess rigs are removed from bar 37 and set aside. Finally, it will be observed that the ground rigs are alike and may be readily interchanged, if desired, simply by manipulating the clamps 39 securing the rigs to bar 37. The drive from the rear axle structure is direct, no countershaft being employed. The coupling elements operatively connecting the seeder shafts together are conventional parts which are readily securable in place by means of cotter pins, as are the links 87 and the driven sprocket 91. These features afford simplicity and durability of construction and result in a device which can be readily assembled, in whole or in part, on a tractor and thereafter quickly changed to obtain various row combinations, as desired.

It should be obvious that although the apparatus herein disclosed as embodying the invention has particular utility in the mounting of seeders on a tractor for the planting of vegetable crops, certain features are of more general application and that, therefore, it is not intended to limit the invention to the exact construction and combinations herein shown and described for purposes of illustration as various modifications within the scope of the appended claims may occur to persons skilled in the art.

It is claimed and desired to secure by Letters Patent:

1. In combination; a traveling support including a main frame and a power takeoff element mounted for rotation in a vertical plane extending generally in the direction of travel; an elongated structure carried by said frame to extend transversely thereof; a pair of next adjacent hopper attaching stations disposed on said support and fixedly spaced longitudinally thereof and on opposite sides of said vertical plane; a material dispensing hopper having an attaching portion securable to either of said stations and being fixedly attached to a selected one thereof, said hopper having a rotary shaft extending generally parallel to said structure when said hopper is attached thereto, said shaft having exposed opposite end portions projecting from said hopper sufficiently to position one end portion of said shaft in said vertical plane when said hopper is attached to said one station and to position the other end portion of said shaft in said vertical plane when said hopper is attached to the other of said pair of stations; and a shaft driving element selectively securable to either exposed end portion of said shaft and being secured to that end portion thereof which lies in said vertical plane.

2. In combination; a traveling support including a main frame supported on laterally spaced ground engaging wheels and a power takeoff element laterally offset from a first vertical plane extending in the direction of travel and passing approximately midway between said wheels, said power takeoff element being mounted for rotation in a second vertical plane disposed in laterally offset, parallel relation to said first plane; an elongated structure carried by said frame to extend transversely thereacross in laterally fixed relation thereto with the midportion of said structure lying in said first plane; a plurality of hopper attaching stations fixedly spaced and arranged longitudinally of said structure to present a group of an even number of stations and a group of an odd number of stations with the stations of both groups disposed in generally symmetrical relation to said first plane, said station spacing and arrangement being such that a pair of next adjacent stations consisting of one station of each group is disposed on opposite sides of said second plane; a dual feed material dispensing hopper having an attaching portion securable to any selected one of said stations and being fixedly attached to a selected one of said pair of stations, said hopper having a rotary shaft extending generally parallel to said structure when said hopper is attached thereto, said shaft having exposed opposite end portions projecting from said hopper sufficiently to position one end portion of said shaft in said second plane when said hopper is attached to said one station and to position the other end portion of said shaft in said second plane when said hopper is attached to the other of said pair of stations; and a shaft driving element selectively securable to either exposed end portions of said shaft and being secured to that end portion thereof which lies in said second plane.

3. In combination; a traveling support including a main frame supported on laterally spaced ground engaging wheels and a power takeoff element laterally offset from a first vertical plane extending in the direction of travel and passing approximately midway between said wheels, said power takeoff element being mounted for rotation in a second vertical plane disposed in laterally offset parallel relation to said first plane; an elongated structure carried by said frame to extend transversely thereacross in laterally fixed relation thereto with the midportion of said structure lying in said first plane; a plurality of hopper attaching stations fixedly spaced and arranged longitudinally of said structure to present a group of an even number of stations and a group of an odd number of stations with the stations of both groups disposed in generally symmetrical relation to said first plane, said station spacing and arrangement being such that a pair of next adjacent stations consisting of one station of each group is disposed on opposite sides of said second plane and such that the spacing between said pair of stations is less than the spacing between the inner station of said pair and the midportion of said structure; a dual feed hopper having an attaching portion securable to any selected one of said stations and being fixedly attached to a selected one of said pair of stations, said hopper having a rotary shaft extending generally parallel to said structure when said hopper is attached thereto, said shaft having exposed opposite end portions projecting from said hopper sufficiently to position one end portion of said shaft in said second plane when said hopper is attached to said one station and to position the other end portion of said shaft in said second plane when said hopper is attached to the other of said pair of stations; and a shaft driving element selectively securable to either exposed end portion of said shaft and being secured to that end portion thereof which lies in said second plane.

4. In combination; a traveling support including a pair of longitudinal frame members separated laterally a distance sufficient to provide a space for mounting a material dispensing hopper therebetween and including a power takeoff element disposed laterally outside said frame members, said element being mounted for rotation in a vertical plane extending in the direction of travel; an elongated structure carried by said frame to extend transversely thereacross in laterally fixed relation thereto; a plurality of hopper attaching stations fixedly spaced and arranged longitudinally of said structure to present a group of an even number of stations and a group of an odd number of stations with the stations of both groups disposed in generally symmetrical relation to a portion of said structure disposed approximately midway between said frame members, said station spacing and arrangement being such that a pair of next adjacent stations, consisting of one station of each group, is disposed laterally outside said frame members and on opposite sides of said second plane; a dual feed hopper having an attaching portion securable to any selected one of said stations and being fixedly attached to a selected one of said pair of stations, said hopper having a rotary shaft extending generally parallel to said structure when said hopper is attached thereto, said shaft having exposed opposite end portions projecting from said hopper sufficiently to position one end portion of said shaft in said plane when said hopper is attached to said one station and to position the other end portion of said shaft in said plane when said hopper is attached to the other of said pair of stations; and a shaft driving element selectively securable to either exposed end portions of said shaft and being secured to that end portion thereof which lies in said second plane.

5. In combination; a traveling support including a pair of longitudinal frame members separated laterally a distance sufficient to provide a space for mounting a material dispensing hopper therebetween and including a power takeoff element disposed laterally outside said frame members, said element being mounted for rotation in a vertical plane extending in the direction of travel; an elongated structure carried by said frame to extend transversely thereacross in laterally fixed relation thereto with the midportion of said structure lying midway between said frame members; a plurality of hopper attaching stations fixedly spaced and arranged longitudinally of said structure to present a group of an even number of stations and a group of an odd number of stations with the stations of both groups disposed in generally symmetrical relation to a midportion of said structure, said station spacing and arrangement being such that a pair of next adjacent stations consisting of one station of each group is disposed laterally outside said frame members and on opposite sides of said plane and such that the spacing between said pair of stations is less than the spacing between the inner station of said pair and said midportion of said structure; a dual feed hopper having an attaching portion securable to any selected one of said stations and being fixedly attached to a selected one of said pair of stations, said hopper having a rotary shaft extending generally parallel to said structure when said hopper is attached thereto, said shaft having exposed opposite end portions projecting from said hopper sufficiently to position one end portion of said shaft and said plane when said hopper is attached to a selected one of said pair of stations and to position the other end portion of said shaft in said plane when said hopper is attached to the other station of said pair of stations; and a shaft driving element selectively securable to either exposed end portion of said shaft and being secured to that end portion thereof which lies in said plane.

6. A seeder mechanism comprising an elongated structure, a plurality of hopper attaching stations fixedly spaced and arranged longitudinally of said structure to present a group of an even number of stations and a group of an odd number of stations with the stations of both groups disposed in generally symmetrical relation to the midportion of said structure, said station spacing and arrangement being such that a pair of next adjacent stations consisting of one station of each group is disposed on opposite sides of a vertical plane extending transversely across said structure to one side of said midportion thereof, a material dispensing hopper having an attaching portion securable to any selected one of said stations and being fixedly attached to a selected one of said pair of stations, said hopper having a rotary shaft extending generally parallel to said structure when said hopper is attached thereto, said shaft having exposed opposite end portions projecting from said hopper sufficiently to position one end portion of said shaft in said plane when said hopper is attached to said one station and to position the other end portion of said shaft in said plane when said hopper is attached to the other of said pair of stations, a shaft driving element selectively securable to either exposed end portion of said shaft and being secured to that end portion which lies in said plane, and means for attaching said structure to a mobile carrier frame having a power take-off element thereon with said structure positioned to extend thereacross in fixed transverse relation to the direction of travel with said shaft driving element in power receiving alignment with said power take-off element.

7. A seeder mechanism comprising an elongated structure, a pair of hopper attaching stations fixedly spaced apart longitudinally of said structure and disposed on opposite sides of a vertical plane extending transversely across said structure, a material dispensing hopper having an attaching portion securable to either one of said stations and being fixedly attached to a selected one of said stations, said hopper having a rotary shaft extending generally parallel to said structure when said hopper is attached thereto, said shaft having exposed opposite end portions projecting from said hopper sufficiently to position one end portion of said shaft in said plane when said hopper is attached to said one station and to position the other end portion of said shaft in said plane when said hopper is attached to the other of said pair of stations, and a shaft driving element selectively securable to either exposed end portion of said shaft and being secured to that end portion thereof which lies in said plane.

References Cited in the file of this patent

UNITED STATES PATENTS

| Number | Name | Date |
|---|---|---|
| 1,264,153 | Burgess | Apr. 30, 1918 |
| 1,517,823 | Brown | Dec. 2, 1924 |
| 1,593,504 | Neher | July 20, 1926 |
| 1,729,535 | Brown | Sept. 24, 1929 |
| 1,864,122 | Cole | June 21, 1932 |
| 1,876,485 | Bormann | Sept. 6, 1932 |
| 1,878,871 | Lindgren | Sept. 20, 1932 |
| 1,918,950 | Altgelt | July 18, 1933 |
| 2,066,666 | Becker | Jan. 5, 1937 |
| 2,323,278 | Silver | June 29, 1943 |
| 2,351,078 | Silver | June 13, 1944 |
| 2,373,920 | Silver | Apr. 17, 1945 |
| 2,468,023 | Blue | Apr. 26, 1949 |
| 2,528,352 | Faucett | Oct. 31, 1950 |